US012591268B2

(12) United States Patent
Wanierke et al.

(10) Patent No.: US 12,591,268 B2
(45) Date of Patent: Mar. 31, 2026

(54) SYNCHRONIZATION METHOD AND MEASUREMENT SYSTEM

(71) Applicant: Rohde & Schwarz GmbH & Co. KG, Munich (DE)

(72) Inventors: Otmar Wanierke, Munich (DE); Corbett Rowell, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 109 days.

(21) Appl. No.: 18/777,990

(22) Filed: Jul. 19, 2024

(65) Prior Publication Data

US 2025/0199565 A1 Jun. 19, 2025

(30) Foreign Application Priority Data

Dec. 19, 2023 (EP) ..................................... 23218268

(51) Int. Cl.
*G06F 1/12* (2006.01)
*G06F 1/08* (2006.01)

(52) U.S. Cl.
CPC . *G06F 1/12* (2013.01); *G06F 1/08* (2013.01)

(58) Field of Classification Search
CPC ..................................... G06F 1/12; G06F 1/08
See application file for complete search history.

(56) References Cited

U.S. PATENT DOCUMENTS

| | | | |
|---|---|---|---|
| 9,292,037 B2 | 3/2016 | Siddique | |
| 2005/0286507 A1* | 12/2005 | Österling | H04L 7/005 |
| | | | 370/363 |
| 2013/0343490 A1 | 12/2013 | Wertz et al. | |
| 2017/0288681 A1* | 10/2017 | Appleton | H03L 7/0802 |
| 2017/0359210 A1 | 12/2017 | Chaloupka et al. | |
| 2024/0168516 A1* | 5/2024 | Ye | G06F 1/12 |

FOREIGN PATENT DOCUMENTS

EP 4192138 A1 6/2023

OTHER PUBLICATIONS

White Paper: "Understanding and Testing Multi-Channel RF Systems with Signal Generators, Part 1: Timing Synchronization", Oct. 22, 2018, pp. 1-10.
Zhao, Y. et al.: "A Stable Clock Synchronization Based on Clock Drift Rate", Network and Parallel Computing, NPC, IFIP, IEEE NJ, USA, Oct. 18, 2018, pp. 204-209.

* cited by examiner

*Primary Examiner* — Stefan Stoynov
(74) *Attorney, Agent, or Firm* — CHRISTENSEN O'CONNOR JOHNSON KINDNESS PLLC

(57) ABSTRACT

A synchronization method of synchronizing at least two signal processing circuits of a measurement system is described. The at least two signal processing circuits include a first signal processing circuit and a second signal processing circuit generating a first local clock count and a second local clock count, respectively.

20 Claims, 4 Drawing Sheets

Fig. 3

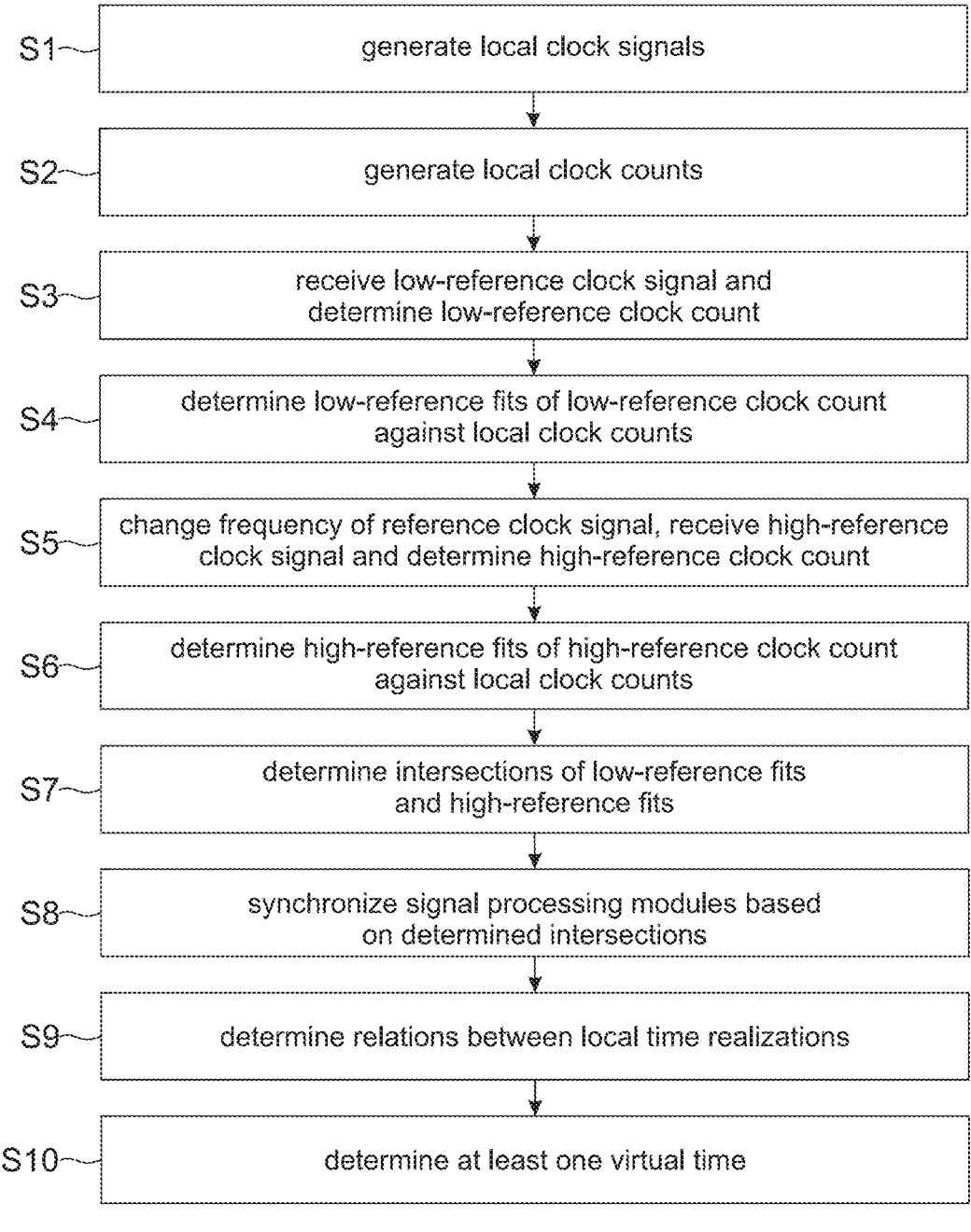

S1 — generate local clock signals

S2 — generate local clock counts

S3 — receive low-reference clock signal and determine low-reference clock count

S4 — determine low-reference fits of low-reference clock count against local clock counts S5 — change frequency of reference clock signal, receive high-reference clock signal and determine high-reference clock count S6 — determine high-reference fits of high-reference clock count against local clock counts S7 — determine intersections of low-reference fits and high-reference fits S8 — synchronize signal processing modules based on determined intersections S9 — determine relations between local time realizations S10 — determine at least one virtual time

SYNCHRONIZATION METHOD AND MEASUREMENT SYSTEM

FIELD OF THE DISCLOSURE

Embodiments of the present disclosure generally relate to a synchronization method of synchronizing at least two signal processing circuits of a measurement system. Embodiments of the present disclosure further relate to a measurement system.

BACKGROUND

Certain types of tests performed on one or more electronic devices under test require a precise synchronization of two or more processing circuits such that the respective results obtained are precisely aligned in the time domain.

Known techniques typically use a highly precise clock signal as a reference signal, and/or additional directional couplers with an additional receiver circuit in order to synchronize the processing circuits. Therein, the input signals of the processing circuits are forwarded to the additional receiver circuits by the directional couplers. The additional receiver circuit determines phase and timing offsets between the processing circuits in order to synchronize the processing circuits.

However, this approach makes the measurement system more complex and causes additional manufacturing costs. Further, this approach often cannot be retroactively implemented in measurement devices that do not have an additional receiver circuit, or only with high efforts.

Thus, there is a need for a synchronization method of synchronizing at least two signal processing circuits as well as a measurement system that are more cost-efficient.

SUMMARY

The following summary of the present disclosure is intended to introduce different concepts in a simplified form that are described in further detail in the detailed description provided below. This summary is neither intended to denote essential features of the present disclosure nor shall this summary be used as an aid in determining the scope of the claimed subject matter.

Embodiments of the present disclosure provide a synchronization method of synchronizing at least two signal processing circuits of a measurement system. The at least two signal processing circuits comprise a first signal processing circuit, wherein the first signal processing circuit comprises a first local oscillator generating a first local clock signal. The first signal processing circuit further comprises a first clock counter circuit that is configured to generate a first local clock count of the first local clock signal. The at least two signal processing circuits further comprise a second signal processing circuit, wherein the second signal processing circuit comprises a second local oscillator generating a second local clock signal. The second signal processing circuit further comprises a second clock counter circuit that is configured to generate a second local clock count of the second local clock signal. In an embodiment, the synchronization method comprises:

receiving a low-reference clock signal having a low-reference frequency;

determining a low-reference clock count of the low-reference clock signal;

determining a first low-reference fit of the low-reference clock count against the first local clock count and a second low-reference fit of the low-reference clock count against the second local clock count;

receiving a high-reference clock signal having a high-reference frequency;

determining a high-reference clock count of the high-reference clock signal;

determining a first high-reference fit of the high-reference clock count against the first local clock count and a second high-reference fit of the high-reference clock count against the second local clock count;

determining an intersection of the first low-reference fit and the first high-reference fit;

determining an intersection of the second low-reference fit and the second high-reference fit; and synchronizing the first signal processing circuit and the second signal processing circuit based on the determined intersections.

The synchronization method according to embodiments of the present disclosure is based on the idea to consecutively provide two reference clock signals having different frequencies, namely the low-reference clock signal and the high-reference clock signal, to the at least two signal processing circuits.

Therein, the reference clock signals may be derived from one of the local clock signals or may be provided by an external clock source.

At first, either the low-reference clock signal or the high-reference clock signal is received, and the corresponding fits against the local clock signals or against the local clock counts are determined. Then, the frequency of the reference clock signal is changed instantaneously, and the other one of the low-reference clock signal and the high-reference clock signal is received and the corresponding fits against the local clock signals or against the local clock counts are determined.

The intersection of the first low-reference fit and the first high-reference fit then corresponds to the time at which the frequency of the reference clock signal has changed instantaneously.

Likewise, the intersection of the second low-reference fit and the second high-reference fit then corresponds to the time at which the frequency of the reference clock signal has changed instantaneously.

Accordingly, both intersections correspond to the same point in time, which can be utilized in order to synchronize the at least two signal processing circuits.

In an embodiment, the at least two signal processing circuits may use the respective intersection (determined) as a reference time or as an offset, such that measurement results obtained by the at least two signal processing circuits relate to the same time reference, namely the instantaneous change of the frequency of the reference clock signal.

It has turned out that the intersections can be determined with a resolution that is significantly higher than the resolution $1Vf\_i$ provided by the local clock signals having frequency $f\_i$.

Accordingly, the synchronization method according to embodiments of the present disclosure allows for a precise synchronization of the at least two signal processing circuits.

Further, no additional hardware components such as directional couplers or additional receiver circuits are necessary, and thus are omitted in example embodiments of the present disclosure. Accordingly, the synchronization method according to embodiments of the present disclosure is particularly cost-efficient.

Moreover, the synchronization method according to embodiments of the present disclosure is also suitable for a subsequent implementation into measurement systems or measurement instruments, as the steps required for synchronization can be performed by an appropriately configured computer program. Accordingly, the measurement system may be retroactively configured to perform the synchronization method by a software update, for example a firmware update.

It is noted that the at least two signal processing circuits may be integrated into the same electronic device, i.e. within the same housing. For example, the at least two signal processing circuits may be integrated into the same measurement instrument.

Alternatively or additionally, the at least two signal processing circuits may be integrated into different electronic devices, i.e. within different housings. For example, the at least two signal processing circuits may be integrated into different measurement instruments.

According to an aspect of the present disclosure, the first low-reference fit and the second low-reference fit are obtained, for example, based on the same fitting function. Alternatively or additionally, the first high-reference fit and the second high-reference fit are obtained based on the same fitting function. However, it is to be understood that different fitting functions could be used.

In an embodiment of the present disclosure, the first low-reference fit and the second low-reference fit each are a polynomial fit. Alternatively or additionally, the first high-reference fit and the second high-reference fit each are a polynomial fit. In an embodiment, the polynomial fit is a linear fit or a quadratic fit. With polynomial fits, linear and/or nonlinear relations between the respective reference clock signal and the respective local clock signal can be described reliably.

For example, linear fits are sufficient if no or only small deviations from a linear relation between the respective reference clock signal and the respective local clock signal are to be expected. This may be the case if no significant temperature changes of the signal processing circuits are to be expected, for example if the signal processing circuits have already been operating for a sufficient amount of time after starting measurements.

Quadratic fits may be used if deviations from a linear relation between the respective reference clock signal and the respective local clock signal are to be expected, e.g. due to the signal processing circuit(s) warming up. Such thermal effects usually manifest in quadratic deviations from the linear relation.

However, it is to be understood that higher order fits are in principle also possible.

It is also conceivable that the polynomial fit is automatically adjusted during operation, and/or that the polynomial fit is adjustable by a user. For example, the polynomial fit may be adjusted based on operational parameters of the at least two signal processing circuits, such as a temperature and/or a runtime.

In a certain example, the polynomial fit may be adapted from a quadratic fit to a linear fit or vice versa.

According to another aspect of the present disclosure, the low-reference clock signal and the high-reference clock signal, for example, each are different from both the first local clock signal and the second local clock signal. In an embodiment, a frequency of the low-reference clock signal is different from the frequency of the first local clock signal and from the frequency of the second local clock signal. Further, a frequency of the high-reference clock signal is different from the frequency of the first local clock signal and from the frequency of the second local clock signal As already mentioned above, the low-reference clock signal and the high-reference clock signal each may be derived from one of the local clock signals or may be provided by an external clock source.

In a further embodiment of the present disclosure, the low-reference frequency and the high-reference frequency each are smaller than a frequency of the first local clock signal and than a frequency of the second local clock signal. This allows to determine the low-reference fits and the high-reference fits with high precision. Accordingly, the intersections can be determined with high precision, namely with a resolution that is significantly higher than the resolution $1Vf\_i$ provided by the local clock signals having frequency $f\_i$.

A further aspect of the present disclosure provides, for example, that the low-reference frequency is smaller than the high-reference frequency by at least a predetermined factor, for example by at least a predetermined factor of 2, 5, 10, 50 or 100. In general, the accuracy of the determined intersections may deplete if the low-reference frequency and the high-reference frequency are too similar. By choosing an appropriate predetermined factor, the accuracy of the determined intersections and thus the accuracy of the synchronization is enhanced.

In an embodiment, it is also conceivable that the low-reference frequency may be equal to zero.

In a further embodiment of the present disclosure, the first local oscillator and the second local oscillator are independent of each other. In other words, the at least two signal processing circuits can be operated based on local clock signals that are independent of each other, i.e. no phase-locking and/or frequency-locking between the local oscillators of different signal processing circuits is required in order to perform the synchronization method according to the present disclosure.

Another aspect of the present disclosure provides, for example, that a first local time realization is determined based on the first clock count, and/or that a second local time realization is determined based on the first clock count. Therein the intersection of the first low-reference fit and the first high-reference fit corresponds to an offset or to the origin of the first time realization. Likewise, the intersection of the second low-reference fit and the second high-reference fit corresponds to an offset or to the origin of the second time realization. Accordingly, the time realizations both refer to the same event in time, namely the instantaneous change from the low-frequency reference clock signal to the high-frequency reference clock signal.

In an embodiment, the coefficients describing the first local time realization may be updated in predefined time intervals, for example periodically, and/or at predetermined events. Alternatively or additionally, coefficients describing the second local time realization may be updated in predefined time intervals, for example periodically, and/or at predetermined events. Thus, it is ensured that small errors in the coefficients describing the local time realizations do not add up to significant errors over time.

In an embodiment, the intersection of the first low-reference fit and the first high-reference fit, and the intersection of the second low-reference fit and the second high-reference fit may be determined only once for the synchronization of the at least two signal processing circuits, e.g. at a startup of the signal processing circuits.

Afterwards, the intersections may only be determined again if at least one of the signal processing circuits is reset and/or if at least one further signal processing circuit is added to the measurement system.

In an embodiment of the present disclosure, at least one virtual time is defined in the measurement system. The at least one virtual time may be defined in the software, for example in the firmware belonging to the set of interoperating signal processing circuits.

In general, measurements may be conducted by the signal processing circuits with respect to the at least one virtual time.

In an embodiment, a time offset and/or a frequency offset of the at least one virtual time may be adaptable, for example via a suitable user interface. Accordingly, a user may tune the at least one virtual time similarly to tuning a local oscillator of a time realization in a conventional setup.

A further aspect of the present disclosure provides, for example, that a relation between the at least one virtual time and the first time realization and/or a relation between the at least one virtual time and the second time realization are/is determined. Therein, the coefficients describing the relation between the at least one virtual time and the first time realization or the second time realization are determined such that the local time realizations remain valid.

In an embodiment, the at least one virtual time is aligned in time and/or frequency with at least one event occurring in a signal processed by the first signal processing circuit and/or occurring in a signal processed by the second signal processing circuit. In an embodiment, the at least one virtual time may be aligned in time and/or frequency with at least one event occurring in a signal processed by the first signal processing circuit and/or occurring in a signal processed by the second signal processing circuit. Thus, measurements can be performed based on the at least one virtual time with respect to the at least one event, such that measurement results can be associated with the at least one event.

According to an aspect of the present disclosure, the at least one event, for example, relates to at least one of clock edges from a reference signal, periodically transmitted signals, or PPS signals measured with at least one local time realization.

For example, the reference signal may have a frequency between 1 MHz and 50 MHz, for example between 5 MHz and 20 MHz. However, it is to be understood that the reference signal may have any other suitable frequency, which may depend on the measurements to be performed.

In an embodiment, the PPS signals may be received from a Global Navigation Satellite System (GNSS) device.

In an embodiment, the periodically transmitted signals may relate to a 5G SSB signal sequence.

Embodiments of the present disclosure further provide a measurement system. The measurement system comprises at least two signal processing circuits. In an embodiment, the at least two signal processing circuits comprise a first signal processing circuit, wherein the first signal processing circuit comprises a first local oscillator generating a first local clock signal, and wherein the first signal processing circuit further comprises a first clock counter circuit being configured to generate a first local clock count of the first local clock signal. The at least two signal processing circuits comprise a second signal processing circuit, wherein the second signal processing circuit comprises a second local oscillator generating a second local clock signal, and wherein the second signal processing circuit further comprises a second clock counter circuit being configured to generate a second local clock count of the second local clock signal. The measurement system comprises at least one synchronization circuit, the at least one synchronization circuit being configured to receive a low-reference clock signal and a high-reference clock signal. The measurement system is configured to perform the synchronization method described above.

In an embodiment, the measurement system may be configured to perform the synchronization method according to any one of the variants described above.

Regarding the advantages and further properties of the measurement system, reference is made to the explanations given above with respect to the synchronization method, which also hold for the measurement system and vice versa.

In an embodiment of the present disclosure, the at least two signal processing circuits are integrated into a single electronic device, for example into a single measurement instrument, or into a plurality of electronic devices, for example into a plurality of measurement instruments. Accordingly, a plurality of signal processing circuits provided in a single electronic device and/or a plurality of signal processing circuits provided in different electronic devices can be synchronized by the synchronization method described above.

In an embodiment, the electronic device(s) may be a measurement instrument, for example an oscilloscope, a signal analyzer, a spectrum analyzer, a vector network analyzer, a signal generator, a mobile network tester, a radio frequency (RF) receiver, or any other type of test and/or measurement instrument.

According to another aspect of the present disclosure, the at least two signal processing circuits comprise, for example, a third signal processing circuit and a fourth signal processing circuit, wherein the measurement system is configured to synchronize the first signal processing circuit with the second signal processing circuit based on a first low-reference clock signal having a first low-reference frequency, and wherein the measurement system is configured to synchronize the third signal processing circuit with the fourth signal processing circuit based on a second low-reference clock signal having a second low-reference frequency. Accordingly, several groups of signal processing circuits may be synchronized based on different low-reference frequencies using the synchronization method described above.

In an embodiment, the different low-reference frequencies may be used in order to identify the signal processing circuits being synchronized with each other.

Embodiments of the present disclosure further provide a measurement system. In an embodiment, the measurement system comprises at least two signal processing circuits. The at least two signal processing circuits comprise a first signal processing circuit, wherein the first signal processing circuit comprises a first local oscillator generating a first local clock signal, wherein the first signal processing circuit further comprises a first clock counter circuit being configured to generate a first local clock count of the first local clock signal. The at least two signal processing circuits comprise a second signal processing circuit, wherein the second signal processing circuit comprises a second local oscillator generating a second local clock signal, wherein the second signal processing circuit further comprises a second clock counter circuit being configured to generate a second local clock count of the second local clock signal. The measurement system comprises at least one synchronization circuit, the at least one synchronization circuit being configured to receive a low-reference clock signal and a high-reference clock signal. The measurement system is configured to perform the synchronization method according to any one of the variants described above. The at least two signal processing circuits comprise a third signal processing circuit and a fourth signal processing circuit, wherein the measurement system is configured to synchronize the first signal processing circuit with the second signal processing circuit based on a first low-reference clock signal having a first low-reference frequency, and wherein the measurement system is configured to synchronize the third signal processing circuit with the fourth signal processing circuit based on a second low-reference clock signal having a second low-reference frequency.

Regarding the further advantages and properties of the measurement system, reference is made to the explanations given above with respect to the synchronization method, which also hold for the measurement system and vice versa.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

FIG. 3 schematically shows an example flow chart of a synchronization method of synchronizing at least two signal processing circuits according to an embodiment of the present disclosure;

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
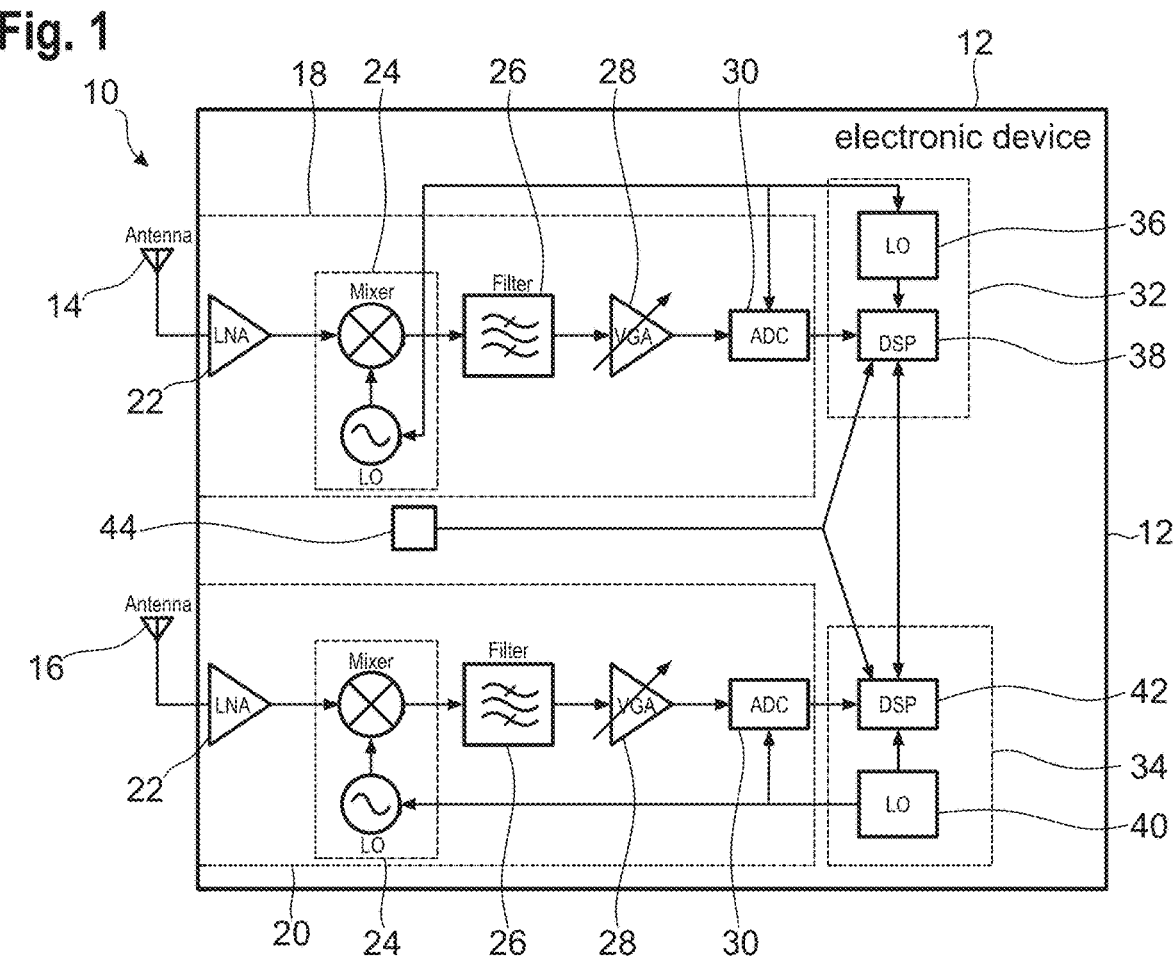
FIG. 1 schematically shows a measurement system according to an embodiment of the present disclosure.

FIG. 1 schematically shows an example of a measurement system 10 in accordance with an embodiment of the present disclosure. As shown in FIG. 1, the system 10 comprises an electronic device 12. In general, the electronic device 12 may be a measurement instrument that is configured to perform measurements on one or several signals, e.g. one or several signals received from at least one device under test. For example, the electronic device 12 may be an oscilloscope, a signal analyzer, a spectrum analyzer, a vector network analyzer, a signal generator, a mobile network tester, a radio frequency (RF) receiver, or any other type of test and/or measurement instrument.

In the embodiment shown in FIG. 1, the measurement system 10 comprises a first radio frequency (RF) antenna 14 and a second RF antenna 16 that are connected with a first RF frontend 18 and a second RF frontend 20 of the electronic device 12, respectively. In an embodiment, the first RF frontend 18 comprises a low-noise amplifier 22, a mixer circuit 24 being configured to down-convert a frequency of an RF signal received via the first RF antenna 14, a band-pass filter 26 provided downstream of the mixer circuit 24, an adjustable amplifier 28 provided downstream of the band-pass filter 26, and an analog-to-digital converter (ADC) 30 being configured to digitize the down-converted signal, thereby obtaining a digitized intermediate frequency (IF) signal. The second RF frontend 20 is established analogously to the first RF frontend 18.

The electronic device 12 further comprises a first signal processing circuit 32 that is provided downstream of the first RF frontend 18. The electronic device 12 comprises a second signal processing circuit 34 that is provided downstream of the second RF frontend 20.

In the embodiment shown in FIG. 1, the first signal processing circuit 32 comprises a first local oscillator 36 and a first digital signal processing circuit 38. The first local oscillator 36 is configured to generate a first local clock signal that is forwarded to the first digital signal processing circuit 38. In the example embodiment shown in FIG. 1, the first local clock signal is also forwarded to the analog-to-digital converter 30 and to the mixer circuit 24 of the first RF frontend 18.

Likewise, the second signal processing circuit 34 comprises a second local oscillator 40, and a second digital signal processing circuit 42. The second local oscillator 40 is configured to generate a second local clock signal that is forwarded to the second digital signal processing circuit 42. In the example embodiment shown in FIG. 1, the second local clock signal is also forwarded to the analog-to-digital converter 30 and to the mixer circuit 24 of the second RF frontend 20.

It is noted that the measurement system 10 in other embodiments may comprise further signal processing circuits that may be provided in the electronic device 12 and/or in another electronic device.

Without restriction of generality, the example case of two signal processing circuits 32, 34 is described hereinafter.

Optionally, the electronic device 12 further comprises a reference signal generator circuit 44 that is configured to generate a reference clock signal and to forward the generated reference clock signal to the signal processing circuits 32, 34, for example to the digital signal processing circuits 38, 42. While the reference signal generator circuit 44 is shown to be established separately from the signal processing circuits 32, 34 in FIG. 1, it is also conceivable that the reference signal generator circuit 44 may be integrated into the first signal processing circuit 32 or into the second signal processing circuit 34.

In an embodiment, the reference signal generator circuit 44 may be established by the first local oscillator 36 or the second local oscillator 40 in combination with a signal generator controlled by the respective local clock signal or in combination with a frequency divider. In other words, the reference clock signal may be derived from the first local clock signal or from the second local clock signal.

Alternatively, the electronic device 12 may comprise a reference signal input that is configured to receive an externally generated reference clock signal and to forward the reference clock signal to the signal processing circuits 32, 34, for example to the digital signal processing circuits 38, 42.

Figure 2:
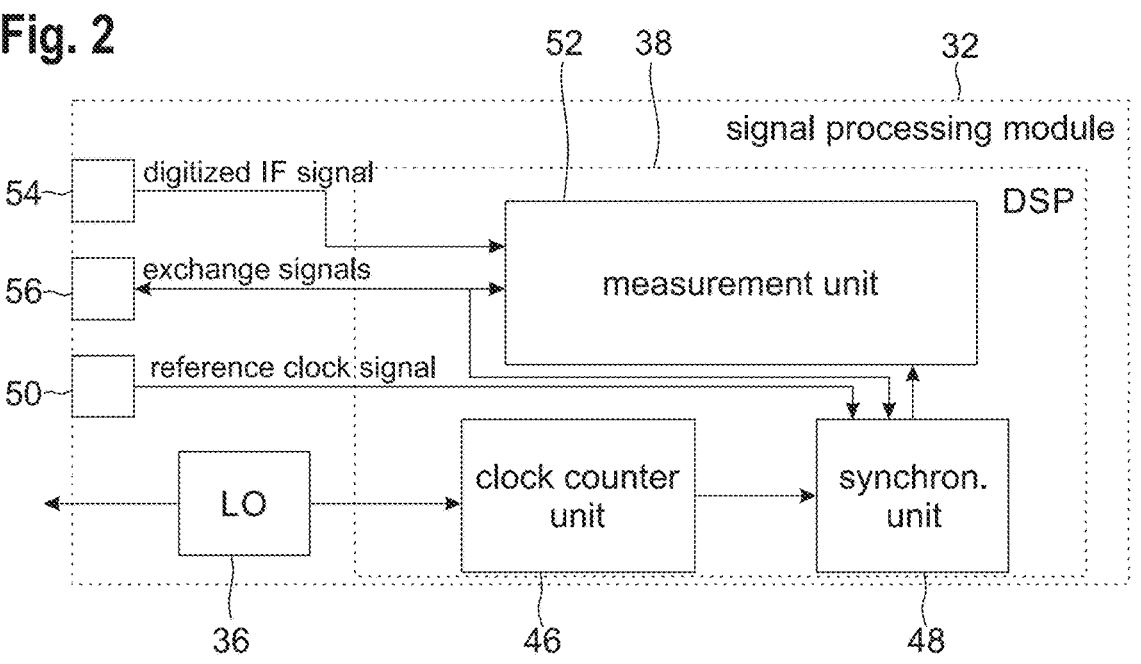
FIG. 2 schematically shows an example of the signal processing circuit of the measurement system of FIG. 1.

FIG. 2 shows an embodiment of the first signal processing circuit 32 in more detail. It is noted that the second signal processing circuit 34 is established analogously to the first signal processing circuit 32. Accordingly, the explanations given hereinafter likewise apply to the second signal processing circuit 34.

As shown in FIG. 2, the first digital signal processing circuit 38 comprises a first clock counter circuit 46 that is connected with the first local oscillator 36 so as to receive the first local clock signal. The first digital signal processing circuit 38 further comprises a synchronization circuit 48 that is connected to the first clock counter circuit 46. The synchronization circuit 48 is connected to a reference input 50 of the first signal processing circuit 32. Therein, the reference input 50 may be connected with the reference signal generator circuit 44 of the electronic device 12 so as to receive the corresponding reference clock signal. The first digital signal processing circuit 38 may further comprise a measurement circuit 52 that is connected to the synchronization circuit 48 and, optionally, to the first clock counter circuit 46.

In the embodiment shown in FIG. 2, the first signal processing circuit 32 further comprises a measurement input 54 that is configured to receive the digitized IF signal from the analog-to-digital converter 30 and to forward the digitized IF signal to the measurement circuit 52. The first signal processing circuit 32 comprises a synchronization port 56 that is connected to the synchronization circuit 48. In general, the synchronization port 56 may be connected to at least one further signal processing circuit, for example the second signal processing circuit 34, such that signals or data can be exchanged between the signal processing circuits 32, 34 via the synchronization port 56.

The measurement system 10 is configured to perform a synchronization method of synchronizing the at least two signal processing circuits 32, 34. The example of the method is described hereinafter with reference to FIG. 3.

A first local clock signal is generated by the first local oscillator 36, and a second local clock signal is generated by the second local oscillator 40 (step S1).

Therein, the first local oscillator 36 and the second local oscillator 40 are independent of each other, i.e. no phase coupling or frequency coupling between the local oscillators is required. In an embodiment, the first local clock signal and the second local clock signal may have (approximately) equal frequencies or frequencies being different from each other.

A first local clock count of the first local clock and a second local clock count of the second local clock are determined by the clock counter circuits 46 of the signal processing circuits 32, 34 (step S2).

The first local clock count $n_1$ is associated with a frequency $f_1$ of the first local clock signal and a first local time $t_1$ via $t_1=n_1/f_1+c_1$, wherein $c_1$ is an adaptable offset.

Likewise, the second local clock count $n_2$ is associated with a frequency $f_2$ of the second local clock signal and a second local time $t_2$ via $t_2=n_2/f_2+c_2$, wherein $c_2$ is an adaptable offset.

A low-reference clock signal having a low-reference frequency $f_{low}$ is received by the synchronization circuits 48 of each of the signal processing circuits 32, 34, and a corresponding low-reference clock count is determined (step S3).

In an embodiment, each synchronization circuit 48 may determine a low-reference clock count of the low-reference clock signal.

Like already indicated above, the low-reference clock signal may be generated by the reference signal generator circuit 44, may be derived from one of the local oscillator signals, or may be received from an external source.

The low-reference frequency $f_{low}$ may be smaller than any of the frequencies $f_i$ of the local clock signals, for example by several orders of magnitude. For example, the low-reference frequency $f_{low}$ may be between 1 kHz to 100 kHz. However, it is to be understood that the frequency ranges are possible depending on the respective application. For example, it is also conceivable that the low-reference frequency $f_{low}$ may be equal to 0.

A first low-reference fit of the low-reference clock count against the first local clock count is determined by the synchronization circuit 48 of the first signal processing circuit 32, and a second low-reference fit of the low-reference clock count against the second local clock count is determined by the synchronization circuit 48 of the second signal processing circuit 34 (step S4).

In an embodiment, the first low-reference fit and the second low-reference fit may each be a polynomial fit, for example a quadratic fit or a linear fit. In an embodiment, the first low-reference fit and the second low-reference fit may be obtained based on the same fitting function. However, it is in principle also conceivable that different fitting functions may be used.

The frequency of the reference clock signal is changed instantaneously, such that a high-reference clock signal having a high-reference frequency $f_{high}$ is received by means of each of the synchronization circuits 48 of the signal processing circuits 32, 34, and a corresponding high-reference clock count is determined (step S5).

In an embodiment, each synchronization circuit 48 may determine a high-reference clock count of the high-reference clock signal. For example, the high-reference frequency $f_{high}$ may be between 1 MHz and 100 MHz. However, it is to be understood that the frequency ranges are possible depending on the respective application.

Like already indicated above, the high-reference clock signal may be generated by the reference signal generator circuit 44, may be derived from one of the local oscillator signals, or may be received from an external source.

The high-reference frequency $f_{high}$ may be smaller than any of the frequencies $f_i$ of the local clock signals. Moreover, the low-reference frequency $f_{low}$ is smaller than the high-reference frequency $f_{high}$ by at least a predetermined factor, for example by at least a predetermined factor of 2, 5, 10, 50 or 100.

A first high-reference fit of the high-reference clock count against the first local clock count is determined by the synchronization circuit 48 of the first signal processing circuit 32, and a second high-reference fit of the high-reference clock count against the second local clock count is determined by the synchronization circuit 48 of the second signal processing circuit 34 (step S6).

In an embodiment, the first high-reference fit and the second high-reference fit may each be a polynomial fit, for example a quadratic fit or a linear fit. In an embodiment, the first high-reference fit and the second high-reference fit may be obtained based on the same fitting function. However, it is in principle also conceivable that different fitting functions may be used.

The result of steps S1 to S6 described above is shown in FIG. 4, which shows a plot of the reference clock count of the reference clock signal (denoted as "external clock counter" in FIG. 4), i.e. of the low-reference clock signal and subsequently the high-reference clock signal, against the first local clock count or the second local clock count (denoted as "internal clock counter" in FIG. 4).

Figure 4:
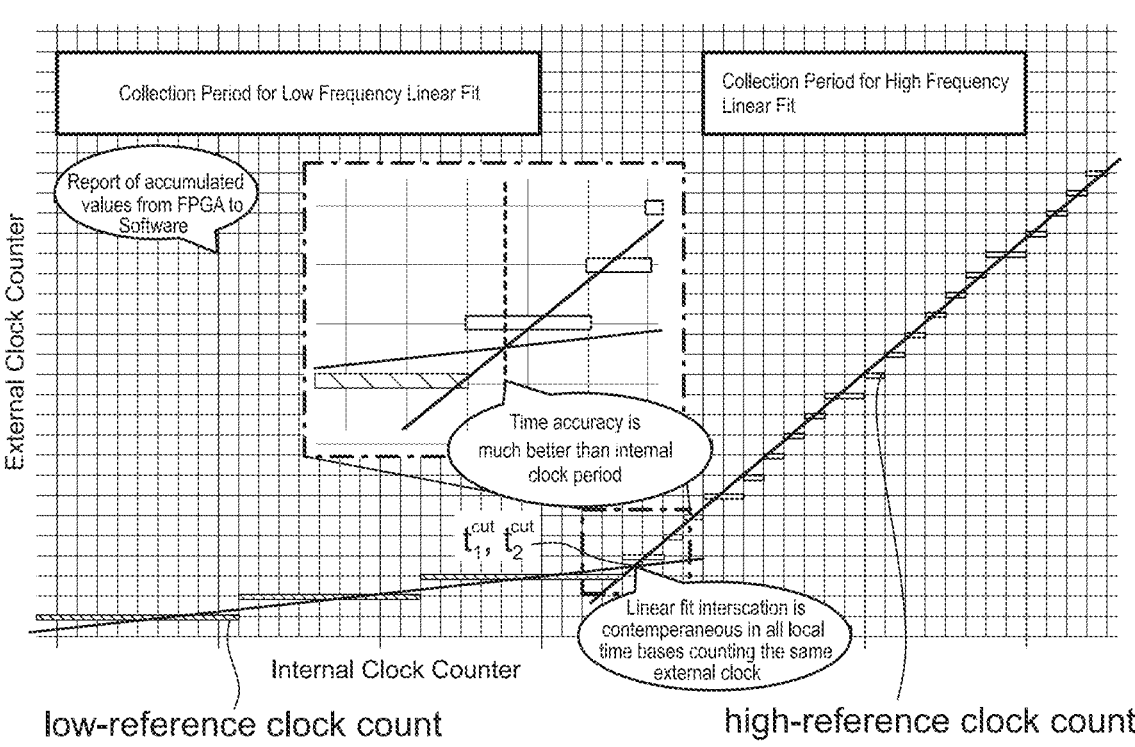
FIG. 4 shows an example diagram of a counter of an external clock plotted against a counter of an internal clock.

It is noted that while linear fits are shown in FIG. 4, the fits may also be quadratic or even of higher order in order to account for perturbations, e.g. due to thermal effects.

For the certain example of linear fits being used to describe the relation between the reference clock count $\gamma$ and the respective local clock count $x_i$, the following two fits are determined by the synchronization circuit 48 of the first signal processing circuit 32:

$$y_1^{low} = \alpha_1^{low}x_1 + \beta_1^{low},$$
$$y_1^{high} = \alpha_1^{high}x_1 + \beta_1^{high}.$$

Therein and in the following, parameters (e.g. $\alpha$ and $\beta$) with superscript "low" are associated with the respective low-reference fit, while parameters with superscript "high" are associated with the respective high-reference fit.

The following two fits are determined by the synchronization circuit 48 of the second signal processing circuit 34:

$$y_2^{low} = \alpha_2^{low}x_2 + \beta_2^{low},$$
$$y_2^{high} = \alpha_2^{high}x_2 + \beta_2^{high}$$

An intersection of the first low-reference fit and the first high-reference fit is determined by the synchronization circuit 48 of the first signal processing circuit 32, and an intersection of the second low-reference fit and the second high-reference fit is determined by the synchronization circuit 48 of the second signal processing circuit 34 (step S7).

The intersection $$t_1^{cut}$$

of the first low-reference fit and the first high-reference fit then corresponds to the time at which the frequency of the reference clock signal has changed instantaneously. Likewise, the intersection $$t_2^{cut}$$

of the second low-reference fit and the second high-reference fit then corresponds to the time at which the frequency of the reference clock signal has changed instantaneously.

The first signal processing circuit 32 and the second signal processing circuit 34 are synchronized based on the determined intersections (step S8).

The intersections correspond to a concurrent event for all local time realizations (namely the instantaneous change of the reference clock signal in frequency), which can be utilized in order to synchronize the at least two signal processing circuits 32, 34.

Therein the intersection $$t_1^{cut}$$

of the first low-reference fit and the first high-reference fit corresponds to an offset or to the origin of the first time realization, i.e. the parameter $c_1$ described above may be determined based on the intersection $$t_1^{cut}.$$

Likewise, the intersection $$t_2^{cut}$$

of the second low-reference fit and the second high-reference fit corresponds to an offset or to the origin of the second time realization, i.e. the parameter $c_2$ described above may be determined based on the intersection $$t_2^{cut}.$$

Accordingly, digitized IF signals received by the measurement circuits 52 of the at least two signal processing circuits 32, 34 can be processed with reference to the respective offset, but based on independently operated local oscillators 36, 40.

The steps described hereinafter may be performed by the first signal processing circuit 32, the second signal processing circuit 34, or by a further signal processing circuit that is provided separately from the first signal processing circuit 32 and the second signal processing circuit 34.

For example, the steps described hereinafter may be performed by appropriately configured software, for example firmware, of the electronic device 12 or of another electronic device.

In an embodiment, the steps described hereinafter may be performed by appropriately configured software, for example firmware, of the first signal processing circuit 32, of the second signal processing circuit 34, or of another signal processing circuit.

The data necessary for performing the steps described hereinafter may be exchanged via the synchronization ports 56 of the signal processing circuits 32, 34.

Relations between the local time realizations $t_i$ and $t_j$ may be determined based on the determined intersections and based on the reference clock signal, for example the high-reference clock signal (step S9).

The relations may be linear and may be determined according to $$t_i = a_{ij}t_j + b_{ij}.$$

Therein, the coefficients are given by $$a_{ij} = \alpha_i^{high}/\alpha_j^{high}$$
$$b_{ij} = t_i^{cut} - a_{ij}t_j^{cut}.$$

However, it is to be understood that the relations could also be non-linear, for example quadratic. The $$\alpha_i^{high}$$

can be determined as described hereinafter. Based on $\Delta y/f = \Delta x/f_i$ the frequency ratio $$r_i = f_i/f_{high} = 1/\alpha_i^{high}$$

is determined, wherein $f$ is equal to the frequency of the reference clock signal, i.e. it holds $f = f_{high}$.

The value $$\alpha_i^{high}$$

is taken from the linear relation $$y = \alpha_i^{high} x_i + \beta_i^{high}.$$

Regarding the formulas for a linear fit, $$\alpha_i^{high}$$

can be calculated from the following sums:

$$S_1 = \sum_x 1$$

$$S_x = \sum_x x$$

$$S_{xx} = \sum_x x^2$$

$$S_y = \sum_x y(x)$$

$$S_{xy} = \sum_x xy(x)$$

The sums are calculated for a certain interval $x=x_{min} \cdots x_{max}$ and for this interval the three sums $S_1$, $S_x$ and $S_{xx}$ can be calculated from the interval limits in the software used to calculate the frequency relation.

The other two sums may be prepared in accumulation circuits realized in hardware for $$S'_y = \sum_{x=x_{min}}^{x_{max}} y(x) - y(x_{min})$$

$$S'_{xy} = \sum_{x=x_{min}}^{x_{max}} (x - x_{min})(y(x) - y(x_{min}))$$

an can be used for determining the frequency relation $r_i$ together with $x_{min}$, $x_{max}$ and $y(x_{min})$.

At least one virtual time $\tau_v$ may be determined (step S10).

In an embodiment, for each pair of virtual time $\tau_v$ and local time realization $t_i$, coefficients $c_{vi}$, $d_{vi}$, $e_{iv}$, $g_{iv}$ are determined for the linear relations $t_i = c_{iv}\tau_v + d_{iv}$ and $\tau_v = e_{vi}t_i + g_{vi}$.

The coefficients are determined in a way that the local time realizations $t_i$ described above or the relations between the local time realizations $t_i$ remain valid.

This can be realized after one relation between $\tau_v$ and one local time realization $t_i$ was chosen with $e_{vi}$, $g_{vi}$ and the other relations are determine from this relation and the pairwise measured time relations $a_{ij}$, $b_{ij}$ by:

$$e_{vj} = e_{vi}a_{ij}$$

$$g_{vj} = e_{vi}b_{ij} + g_{vi}$$

Any virtual time $\tau_i$ can be aligned in time or at least in frequency to certain events measured with one of the signal processing circuits 32, 34, or more precisely with one of the measurement circuits 52.

The events may relate to at least one of clock edges from a reference signal, periodically transmitted signals, or PPS signals measured with at least one local time realization.

For example, the reference signal may have a frequency between 1 MHz and 50 MHz, for example between 5 MHz and 20 MHz. However, it is to be understood that the reference signal may have any other suitable frequency, which may depend on the measurements to be performed.

In an embodiment, the PPS signals may be received from a Global Navigation Satellite System (GNSS) device.

In an embodiment, the periodically transmitted signals may relate to a 5G SSB signal sequence.

If the virtual time is not synchronized to any external (sequence of) events the virtual time can be aligned to the average time of the local time realizations including known frequency offsets $$\Delta f_i = f_i - f_i^0$$

of the local oscillators 36, 40 to their nominal frequency $$f_i^0,$$

for example known frequency offsets of the local oscillators 36, 40 at a certain (measured) temperature of the local oscillators 36, 40.

In an embodiment, a time offset and/or a frequency offset of the at least one virtual time $\tau_v$ may be adaptable, for example via a suitable user interface of the electronic device 12. Accordingly, a user may tune the at least one virtual time $\tau_v$ similarly to tuning a local oscillator of a time realization in a conventional setup.

For example, any results obtained by the signal processing circuits 32, 34 may be determined in the virtual time realization, such that a universal time scale for comparing results is provided.

The explanations given above relate to the example embodiment of the measurement system show in FIG. 1, wherein at least two signal processing circuits 32, 34 comprised in a single electronic device 12 are synchronized with each other.

Figure 5:
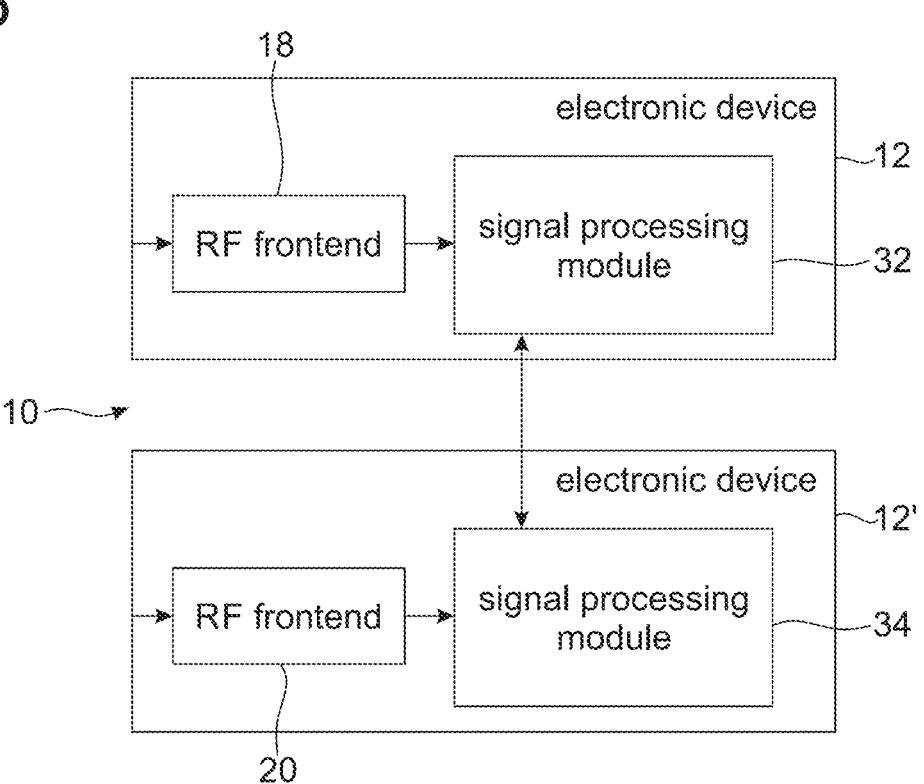
FIG. 5 schematically shows a measurement system according to another embodiment of the present disclosure.

As is illustrated in FIG. 5, the synchronization method described above can likewise be used for synchronizing at least two signal processing circuits integrated into at least two electronic devices 12, 12'. Therein, the reference signal generator circuit 44 (not shown in FIG. 5) may be integrated into the one of the electronic devices 12, 12', for example into the first signal processing circuit 32 or into the second signal processing circuit 34. Alternatively, the electronic devices 12, 12' each may comprise a reference signal input that is configured to receive an externally generated reference clock signal and to forward the reference clock signal to the respective signal processing circuit 32, 34. The other explanations regarding the synchronization method given above likewise apply to the measurement system 10 of FIG. 5.

Figure 6:
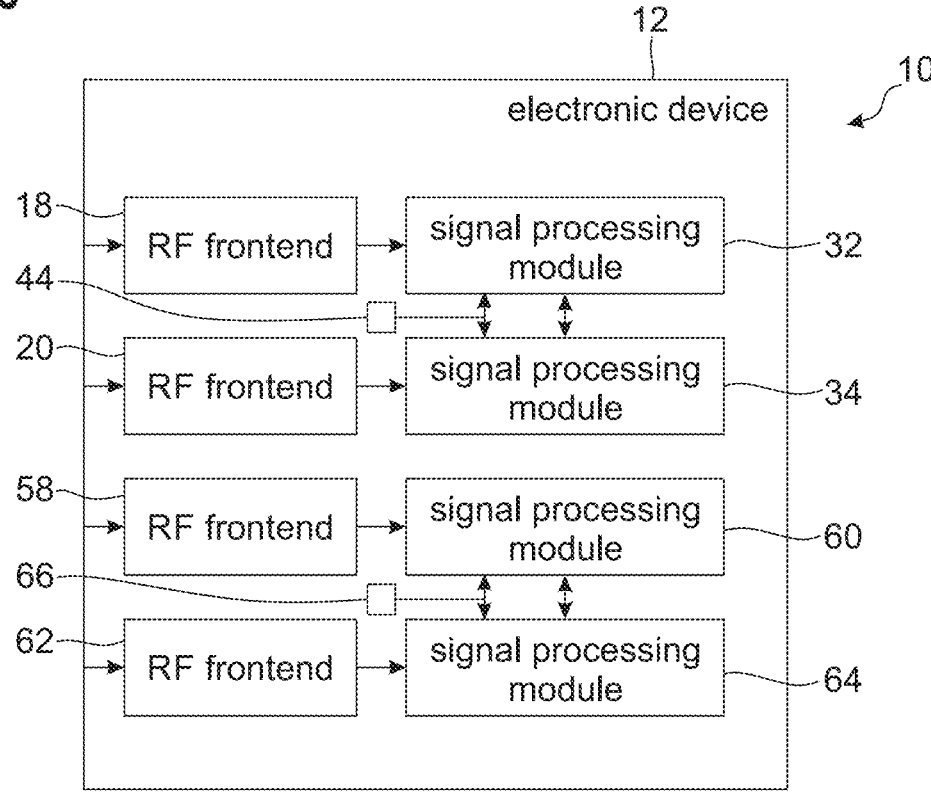
FIG. 6 schematically shows a measurement system according to a yet another embodiment of the present disclosure.

FIG. 6 shows a further example embodiment of the measurement system 10. In this embodiment, the electronic device 12 further comprises a third RF frontend 58 coupled with a third signal processing circuit 60, as well as a fourth RF frontend 62 coupled with a fourth signal processing circuit 64. The third RF frontend 58 and the fourth RF frontend 62 may be established analogously to the first RF frontend 18. Likewise, the third signal processing circuit 60 and the fourth signal processing circuit 64 may be established analogously to the first signal processing circuit 32.

It is to be understood that the signal processing circuits 32, 34, 60, 64 may all be integrated into the electronic device 12 or into a plurality of electronic devices.

The electronic device 12 comprises a further reference signal generator circuit 66 that is established analogously to the reference signal generator circuit 44. The further reference signal generator circuit 66 is connected to the third signal processing circuit 60 and to the fourth signal processing circuit 64. Alternatively, the electronic device 12 may comprise a further reference clock signal input that is connected to the third signal processing circuit 60 and to the fourth signal processing circuit 64.

In the embodiment shown in FIG. 6, the first signal processing circuit 32 is synchronized with the second signal processing circuit 34 via the synchronization method described above. Further, the third signal processing circuit 60 is synchronized with the fourth signal processing circuit 64 via the synchronization method described above.

Therein, different low-reference clock signals may be generated by the reference signal generator circuit 44 and the further reference signal generator circuit 66. In an embodiment, the first signal processing circuit 32 and the second signal processing circuit 34 may be synchronized based on a first low-reference clock signal having a first low-reference frequency, while the third signal processing circuit 60 and the fourth signal processing circuit 64 may be synchronized based on a second low-reference clock signal having a second low-reference frequency.

This can, of course, be generalized to arbitrary groups of signal processing circuits being synchronized within the respective group, wherein different groups may use different low-reference clock signals having different low-reference frequencies for synchronization.

The same high-reference clock signal or the same high-reference frequency may be used for synchronizing the signal processing circuits within the different groups.

When processing measurement results obtained by the signal processing circuits 32, 34, 60, 64, the groups of synchronized signal processing circuits can be identified based on the different low-reference frequencies used for synchronization.

Likewise, the source of the reference clock signal used for synchronization can be identified based on the different low-reference frequencies used for synchronization, e.g. whether the reference signal generator circuit 44 or the further reference signal generator circuit 66 has generated the reference clock signals used for synchronization.

Certain embodiments disclosed herein include systems, apparatus, modules, units, devices, components, etc., that utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used. It will be appreciated that the term "information" can be use synonymously with the term "signals" in this paragraph. It will be further appreciated that the terms "circuitry," "circuit," "one or more circuits," etc., can be used synonymously herein.

In an embodiment, circuitry includes, among other things, one or more computing devices such as a processor (e.g., a microprocessor), a central processing unit (CPU), a graphics processing unit (GPU), a digital signal processor (DSP), an application-specific integrated circuit (ASIC), a field programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

For example, the functionality described herein can be implemented by special purpose hardware-based computer systems or circuits, etc., or combinations of special purpose hardware and computer instructions. Each of these special purpose hardware-based computer systems or circuits, etc., or combinations of special purpose hardware circuits and computer instructions form specifically configured circuits, machines, apparatus, devices, etc., capable of implementing the functionality described herein.

Of course, in an embodiment, two or more of these components, or parts thereof, can be integrated or share hardware and/or software, circuitry, etc. In an embodiment, these components, or parts thereof, may be grouped in a single location or distributed over a wide area. In circumstances where the components are distributed, the components are accessible to each other via communication links.

In an embodiment, one or more of the components of the electronic device 12, the an electronic device 12' etc., referenced above include circuitry programmed to carry out one or more steps of any of the methods disclosed herein. In an embodiment, one or more computer-readable media associated with or accessible by such circuitry contains computer readable instructions embodied thereon that, when executed by such circuitry, cause the component or circuitry to perform one or more steps of any of the methods disclosed herein.

In an embodiment, the computer readable instructions includes applications, programs, program modules, scripts, source code, program code, object code, byte code, compiled code, interpreted code, machine code, executable instructions, and/or the like (also referred to herein as executable instructions, instructions for execution, program code, computer program instructions, and/or similar terms used herein interchangeably).

In an embodiment, computer-readable media is any medium that stores computer readable instructions, or other information non-transitorily and is directly or indirectly accessible to a computing device, such as processor circuitry, etc., or other circuitry disclosed herein etc. In other words, a computer-readable medium is a non-transitory memory at which one or more computing devices can access instructions, codes, data, or other information. As a non-limiting example, a computer-readable medium may include a volatile random access memory (RAM), a persistent data store such as a hard disk drive or a solid-state drive, or a combination thereof. In an embodiment, memory can be integrated with a processor, separate from a processor, or external to a computing system.

Accordingly, blocks of the block diagrams and/or flowchart illustrations support various combinations for performing the specified functions, combinations of operations for performing the specified functions and program instructions for performing the specified functions. These computer program instructions may be loaded onto one or more computer or computing devices, such as special purpose computer(s) or computing device(s) or other programmable data processing apparatus(es) to produce a specifically-configured machine, such that the instructions which execute on one or more computer or computing devices or other programmable data processing apparatus implement the functions specified in the flowchart block or blocks and/or carry out the methods described herein. Again, it should also be understood that each block of the block diagrams and flowchart illustrations, and combinations of blocks in the block diagrams and/or flowchart illustrations, or portions thereof, could be implemented by special purpose hardware-based computer systems or circuits, etc., that perform the specified functions or operations, or combinations of special purpose hardware and computer instructions.

It will be appreciated that in one or more embodiments, the term computer or computing device can include, for example, any computing device or processing structure, including but not limited to a processor (e.g., a microprocessor), a central processing unit (CPU), a digital signal processor (DSP), an application-specific integrated circuit (ASIC), a field-programmable gate array (FPGA), a system on a chip (SoC), a graphics processing unit (GPU) or the like, or any combinations thereof.

In the foregoing description, specific details are set forth to provide a thorough understanding of representative embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure.

Although the method and various embodiments thereof have been described as performing sequential steps, the claimed subject matter is not intended to be so limited. As nonlimiting examples, the described steps need not be performed in the described sequence and/or not all steps are required to perform the method. Moreover, embodiments are contemplated in which various steps are performed in parallel, in series, and/or a combination thereof. As such, one of ordinary skill will appreciate that such examples are within the scope of the claimed embodiments.

In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. In addition, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Thus, it will be appreciated that embodiments of the present disclosure may employ any combination of features described herein. All such combinations or sub-combinations of features are within the scope of the present disclosure.

Throughout this specification, terms of art may be used. These terms are to take on their ordinary meaning in the art from which they come, unless specifically defined herein or the context of their use would clearly suggest otherwise.

The drawings in the FIGURES are not to scale. Similar elements are generally denoted by similar references in the FIGURES. For the purposes of this disclosure, the same or similar elements may bear the same references. Furthermore, the presence of reference numbers or letters in the drawings cannot be considered limiting, even when such numbers or letters are indicated in the claims.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A synchronization method of synchronizing at least two signal processing circuits of a measurement system, wherein the at least two signal processing circuits comprise a first signal processing circuit, wherein the first signal processing circuit comprises a first local oscillator generating a first local clock signal, wherein the first signal processing circuit further comprises a first clock counter circuit being configured to generate a first local clock count of the first local clock signal, wherein the at least two signal processing circuits comprise a second signal processing circuit, wherein the second signal processing circuit comprises a second local oscillator generating a second local clock signal, wherein the second signal processing circuit further comprises a second clock counter circuit being configured to generate a second local clock count of the second local clock signal, wherein the synchronization method comprises:

receiving a low-reference clock signal having a low-reference frequency;

determining a low-reference clock count of the low-reference clock signal;

determining a first low-reference fit of the low-reference clock count against the first local clock count and a second low-reference fit of the low-reference clock count against the second local clock count;

receiving a high-reference clock signal having a high-reference frequency;

determining a high-reference clock count of the high-reference clock signal;

determining a first high-reference fit of the high-reference clock count against the first local clock count and a second high-reference fit of the high-reference clock count against the second local clock count;

determining an intersection of the first low-reference fit and the first high-reference fit;

determining an intersection of the second low-reference fit and the second high-reference fit; and synchronizing the first signal processing circuit and the second signal processing circuit based on the determined intersections.

2. The synchronization method of claim 1, wherein the first low-reference fit and the second low-reference fit are obtained based on the same fitting function, and/or wherein the first high-reference fit and the second high-reference fit are obtained based on the same fitting function.

3. The synchronization method according to claim 1, wherein the first low-reference fit and the second low-reference fit each are a polynomial fit, and/or wherein the first high-reference fit and the second high-reference fit each are a polynomial fit.

4. The synchronization method of claim 3, wherein the polynomial fit is a linear fit or a quadratic fit.

5. The synchronization method according to claim 1, wherein the low-reference clock signal and the high-reference clock signal each are different from both the first local clock signal and the second local clock signal.

6. The synchronization method according to claim 1, wherein the low-reference frequency and the high-reference frequency each are smaller than a frequency of the first local clock signal and than a frequency of the second local clock signal.

7. The synchronization method according to claim 1, wherein the low-reference frequency is smaller than the high-reference frequency by at least a predetermined factor.

8. The synchronization method of claim 7, wherein the predetermined factor is 2, 5, 10, 50 or 100.

9. The synchronization method according to claim 1, wherein the first local oscillator and the second local oscillator are independent of each other.

10. The synchronization method according to claim 1, wherein a first local time realization is determined based on the first clock count, and/or wherein a second local time realization is determined based on the first clock count.

11. The synchronization method of claim 10, wherein coefficients describing the first local time realization are updated in predefined time intervals and/or at predetermined events, and/or wherein coefficients describing the second local time realization are updated in predefined time intervals and/or at predetermined events.

12. The synchronization method of claim 11, wherein coefficients describing the first local time realization are updated periodically, and/or wherein coefficients describing the second local time realization are updated periodically.

13. The synchronization method according to claim 1, wherein at least one virtual time is defined in the measurement system.

14. The synchronization method according of claim 10, wherein at least one virtual time is defined in the measurement system, wherein a relation between the at least one virtual time and the first local time realization and/or a relation between the at least one virtual time and the second local time realization are/is determined.

15. The synchronization method according to claim 13, wherein the at least one virtual time is aligned in time and/or frequency with at least one event occurring in a signal processed by the first signal processing circuit and/or occurring in a signal processed by the second signal processing circuit.

16. The synchronization method according to claim 12, wherein the at least one event relates to at least one of clock edges from a reference signal, periodically transmitted signals, or PPS signals measured with at least one local time realization.

17. A measurement system, the measurement system comprising at least two signal processing circuits, wherein the at least two signal processing circuits comprise a first signal processing circuit, wherein the first signal processing circuit comprises a first local oscillator generating a first local clock signal, wherein the first signal processing circuit further comprises a first clock counter circuit being configured to generate a first local clock count of the first local clock signal, wherein the at least two signal processing circuits comprise a second signal processing circuit, wherein the second signal processing circuit comprises a second local oscillator generating a second local clock signal, wherein the second signal processing circuit further comprises a second clock counter circuit being configured to generate a second local clock count of the second local clock signal, wherein the measurement system comprises at least one synchronization circuit, the at least one synchronization circuit being configured to receive a low-reference clock signal and a high-reference clock signal, and wherein the measurement system is configured to:

receive the low-reference clock signal having a low-reference frequency;

determine a low-reference clock count of the low-reference clock signal;

determine a first low-reference fit of the low-reference clock count against the first local clock count and a second low-reference fit of the low-reference clock count against the second local clock count;

receive the high-reference clock signal having a high-reference frequency;

determine a high-reference clock count of the high-reference clock signal;

determine a first high-reference fit of the high-reference clock count against the first local clock count and a second high-reference fit of the high-reference clock count against the second local clock count;

determine an intersection of the first low-reference fit and the first high-reference fit;

determine an intersection of the second low-reference fit and the second high-reference fit; and synchronize the first signal processing circuit and the second signal processing circuit based on the determined intersections.

18. The measurement system of claim 17, wherein the at least two signal processing circuits are integrated into a single electronic device, or into a plurality of electronic devices.

19. The measurement system of claim 17, wherein the at least two signal processing circuits comprise a third signal processing circuit and a fourth signal processing circuit, wherein the measurement system is configured to synchronize the first signal processing circuit with the second signal processing circuit based on a first low-reference clock signal having a first low-reference frequency, and wherein the measurement system is configured to synchronize the third signal processing circuit with the fourth signal processing circuit based on a second low-reference clock signal having a second low-reference frequency.

20. A measurement system, the measurement system comprising at least two signal processing circuits, wherein the at least two signal processing circuits comprise a first signal processing circuit, wherein the first signal processing circuit comprises a first local oscillator generating a first local clock signal, wherein the first signal processing circuit further comprises a first clock counter circuit being configured to generate a first local clock count of the first local clock signal, wherein the at least two signal processing circuits comprise a second signal processing circuit, wherein the second signal processing circuit comprises a second local oscillator generating a second local clock signal, wherein the second signal processing circuit further comprises a second clock counter circuit being configured to generate a second local clock count of the second local clock signal, wherein the measurement system comprises at least one synchronization circuit, the at least one synchronization circuit being configured to receive a low-reference clock signal and a high-reference clock signal, wherein the measurement system is configured to:

receive the low-reference clock signal having a low-reference frequency;

determine a low-reference clock count of the low-reference clock signal;

determine a first low-reference fit of the low-reference clock count against the first local clock count and a second low-reference fit of the low-reference clock count against the second local clock count;

receive the high-reference clock signal having a high-reference frequency;

determine a high-reference clock count of the high-reference clock signal;

determine a first high-reference fit of the high-reference clock count against the first local clock count and a second high-reference fit of the high-reference clock count against the second local clock count;

determine an intersection of the first low-reference fit and the first high-reference fit;

determine an intersection of the second low-reference fit and the second high-reference fit; and synchronize the first signal processing circuit and the second signal processing circuit based on the determined intersections, wherein the at least two signal processing circuits comprise a third signal processing circuit and a fourth signal processing circuit, wherein the measurement system is configured to synchronize the first signal processing circuit with the second signal processing circuit based on a first low-reference clock signal having a first low-reference frequency, and wherein the measurement system is configured to synchronize the third signal processing circuit with the fourth signal processing circuit based on a second low-reference clock signal having a second low-reference frequency.

* * * * *